Oct. 19, 1943.  W. T. PRITCHARD  2,332,112
CABLE RING
Filed Oct. 20, 1942  2 Sheets-Sheet 1
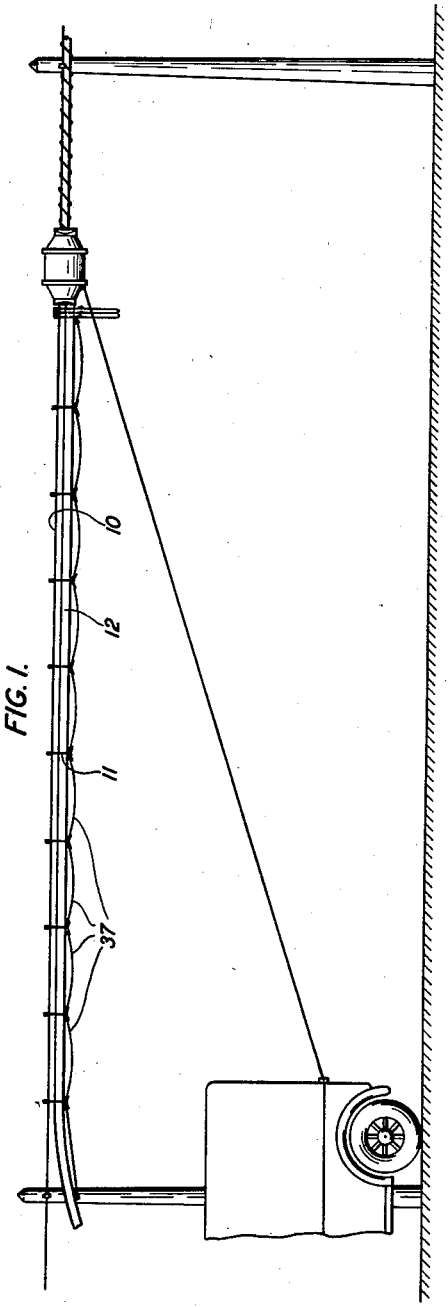
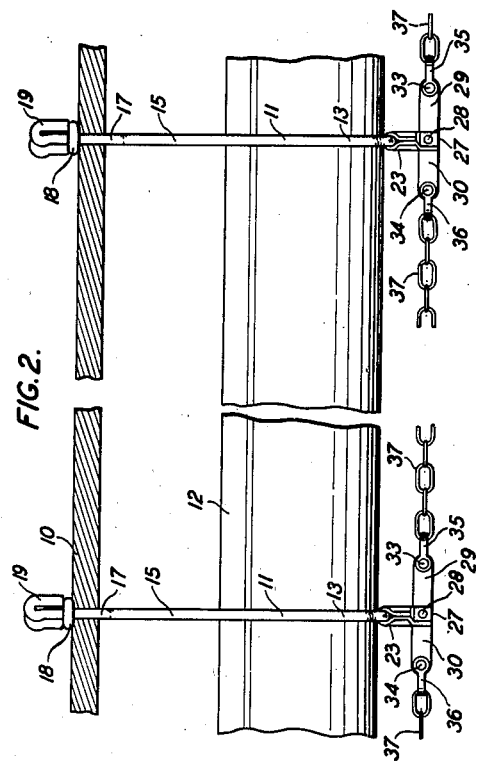
INVENTOR
W. T. PRITCHARD
BY J. MacDonald
ATTORNEY Oct. 19, 1943.   W. T. PRITCHARD   2,332,112
CABLE RING
Filed Oct. 20, 1942   2 Sheets-Sheet 2
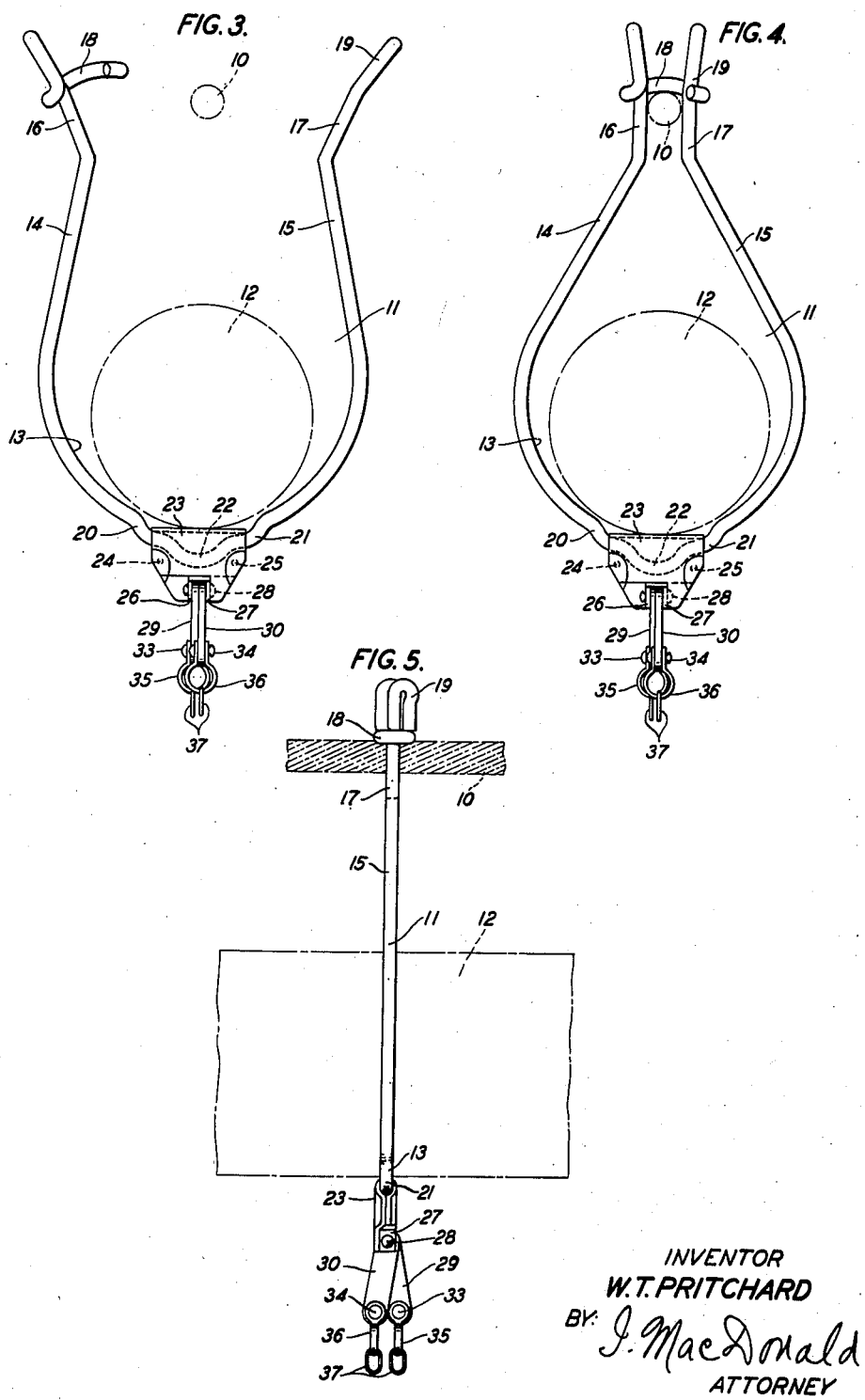
INVENTOR
W. T. PRITCHARD
BY J. MacDonald
ATTORNEY Patented Oct. 19, 1943

2,332,112

UNITED STATES PATENT OFFICE 2,332,112

CABLE RING

William T. Pritchard, Belvidere, N. J., assignor to Bell Telephone Laboratories, Incorporated, New York, N. Y., a corporation of New York Application October 20, 1942, Serial No. 462,715

8 Claims. (Cl. 174—41)

This invention relates to cable supporting rings and more particularly to rings for temporarily suspending aerial cable from a messenger strand prior to the cable being permanently secured thereto by lashing.

The object of this invention is the provision of a temporary support for aerial cable which will not become displaced during the pulling-in of the cable and which may be readily moved out of position as the lashing of the cable progresses.

Another object of this invention is the provision of a temporary support for aerial cable which may be readily applied and removed from the messenger strand with a minimum amount of effort.

A further object of this invention is the provision of a temporary support for aerial cable which will not twist on the strand and which will offer a minimum amount of resistance to the cable as it is being pulled in.

Heretofore in the installation of aerial cable, on messenger strands, by lashing the cables thereto by means of a suitable machine, such as shown and described in Patent 2,272,253 to E. St. Johns dated February 10, 1942, it has been the practice to temporarily support the cable from the messenger strand by means of standard cable rings spaced some distance apart. This practice required a lineman to ride the strand twice; i. e., first, to place the rings in position on the strand and later just ahead of the lashing machine to remove the rings as the lashing of the cable progressed.

It is with the elimination of the riding of the strand to position and remove the rings that this invention is concerned.

With the cable ring of this invention, a method of installing aerial cable, by the lashed cable method, may be practiced which entirely eliminates the riding of the strand, thereby reducing, by a considerable amount, the time required to install the cable and eliminates an objectionable operation.

In the preferred form of my invention, I have provided a cable ring which is substantially pear-shaped in configuration, is constructed of spring material and is provided with an integral latch at the top for positioning and removing it from the strand. Secured to the bottom portion of the ring are downwardly extending link members to which a length of chain or some other suitable material, such as rope is secured for joining a number of these rings together.

A plurality of these rings are secured together in definite spaced relation and are arranged to be pulled-out on the strand with the free ends of the chain or rope secured to the adjacent poles. The cable is then pulled-in in the usual manner by means of a winch line previously positioned therein. The free end of the chain or rope nearest the cable lashing machine is loosened to permit the cable lashing machine to be placed on the strand and to push the rings ahead of it as it proceeds along the strand until the next pole is reached where all the rings are unlatched and positioned on the next span where the operation heretofore described is repeated.

The invention will be more clearly understood from the following detailed description when read in conjunction with the following drawings in which:

Fig. 1 is a fragmentary view of a pole line showing the rings of this invention supporting the cable with the lashing machine pushing the rings ahead of it.

Fig. 2 is a fragmentary view of a section of the supporting strand and aerial cable with the rings of this invention shown in side elevation.

Fig. 3 is a front elevational view of the ring of this invention in its open position with the cable and strand shown in dot-dash.

Fig. 4 is a view similar to Fig. 3 except that the ring is closed and it is suspended from the strand which is shown in dot-dash.

Fig. 5 is a side elevational view of Fig. 4.

As shown in the drawings, 10 discloses a supporting strand, 11 the cable support and 12 the cable.

The support 11 is preferably formed of suitable wire and includes a cable receiving loop 13 having upwardly extending side portions 14 and 15. The upper ends of the side portions 14 and 15, as shown at 16 and 17, in Fig. 3, are bent outwardly at an angle with respect to the side portions so that when they are brought together as shown in Fig. 4, they are in substantial parallel relation.

The upper end 16 of the side member 14 has its end portion bent back upon itself and around it to provide support thereto and the inwardly extending hook portion 18, as shown in Figs. 2, 4 and 5. The hook portion 18 is adapted to receive, when brought together, the bent over end portion 19 of the straight portion 17 of the side member 15 to firmly lock them together to prevent displacement.

As shown in Figs. 3 and 4, the bottom portion of the cable receiving loop 13 is deformed to provide a wave-like configuration which extends outwardly to provide the two small protuberances 20 and 21 and the large protuberance 22. Positioned on the bottom portion of the loop 13 between the protuberances 20 and 21 is the elongated saddle-shaped member 23. This member overlies the large protuberance 22 and is secured in position by having its side portion in close contact with each other and secured together by any suitable means, for example, spot welding as shown at 24 and 25. Due to its particular construction, the member 23 will not interfere with the cable nor rotate around the bottom of the loop as the cable is being pulled thereover.

As shown in the various figures, the side portions of the saddle member 23 are provided with spaced apart integral inturned ears or lugs 26 and 27. These ears are at right angles with respect to the sides of the members 23 and are provided with aligned apertures. Pivotally mounted between the ears 26 and 27 and supported by the rivet 28 which passes therethrough and secured in the apertures in the ears, are the two downwardly depending links 29 and 30. These links are provided at their free ends with apertures in which there is mounted by means of the rivets 33 and 34 the clevices 35 and 36 to which the ends of the chain 37 are secured.

As shown in Fig. 2, the rings are connected together by means of lengths of chains and are spaced a convenient distance apart, for example, approximately five feet.

In installing aerial cable using the improved ring of this invention, the first step for the workman is to open the required number of rings for the particular span and position them on the supporting strand close to the pole. A winch or cable towing line is then threaded through the bunched rings and secured to the end of the cable already in position on the previous span or to the free end of the cable on a reel. The near end of the chain that is the end nearest the pole is then temporarily secured to the pole and the far end is secured to a hand line. Tension applied to the hand line causes the rings to spread out and slide along the supporting strand and be positioned at spaced intervals thereon. When the chain is taut the far end is temporarily secured to the adjacent pole.

The aerial cable is now pulled-in in the usual manner by means of the winch line previously placed therein as heretofore described. After the cable has been pulled-in the near end of the chain is loosened and the first ring moved forward to permit the lashing machine to be placed in position over the supporting strand and cable. As the lashing of the cable proceeds, as shown in Fig. 1, the rings one after the other are engaged and pushed along the strand by the lashing machine. This operation continues until the next pole is reached and the lashing of that particular span is completed, whereupon the bunched rings are unlatched and placed on the strand on the other side of the pole where the heretofore described operation is repeated.

It can be readily observed that with the use of the improved ring of this invention considerable time and effort is saved inasmuch as no riding of the strand is required at any time during the installation of the cable.

While there is shown and described herein the preferred embodiment of my invention, it will be understood that various changes and modifications may be made therein without departing from the spirit of the invention. I do not intend to limit my invention to any particular method for joining the rings together, neither do I limit myself to the spacing of the rings and I am only limited by the scope of the appended claims.

What is claimed is:

1. A cable supporting ring comprising a cable receiving loop, arms extending upwardly from said loop, one of said arms provided with a horizontally extending hook portion and the other with a cooperating return bend portion, a saddle member secured over the bottom portion of said loop and having inwardly extending ears thereon and a pair of link members pivotally supported between said ears.

2. A cable supporting ring comprising a cable receiving loop, parallel arms extending upwardly, in spaced relation, from said loop, one of said arms provided with a horizontally extending hook portion and the other with a cooperating return bend portion, a saddle member secured over the bottom portion of said loop and having inwardly extending ears thereon and a pair of link members pivotally supported between said ears.

3. A cable supporting ring comprising a cable receiving loop, arms extending upwardly from said loop, one of said arms provided with a horizontally extending hook portion and the other with a cooperating return bend portion, the underside of which is in engagement with the top side of said hook member to prevent displacement thereof, a saddle member secured over the bottom portion of said loop and having inwardly extending ears thereon and a pair of link members pivotally supported between said ears.

4. A cable supporting ring comprising a cable receiving loop, parallel arms extending upwardly, in spaced relation, from said loop, one of said arms provided with a horizontally extending hook portion and the other with a cooperating return bend portion, the underside of which is in engagement with the top side of said hook member to prevent displacement thereof, a saddle member secured over the bottom portion of said loop and having inwardly extending ears thereon, said ears being spaced apart and having pivotally mounted therebetween a pair of link members.

5. A cable supporting ring comprising a cable receiving loop, arms extending upwardly from said loop, one of said arms provided with a horizontally extending hook portion and the other with a cooperating return bend portion, a saddle member secured over the bottom portion of said loop and having inwardly extending ears thereon, a pair of link members pivotally supported between said ears, and flexible means secured to the free ends of said link member.

6. A cable supporting ring comprising a cable receiving loop, parallel arms extending upwardly, in spaced relation, from said loop, one of said arms provided with a horizontally extending hook portion and the other with a cooperating return bend portion, a saddle member secured over the bottom portion of said loop and having inwardly extending ears thereon, a pair of link members pivotally supported between said ears, and flexible means secured to the free ends of said link member.

7. A cable supporting ring comprising a cable receiving loop, arms extending upwardly from said loop, one of said arms provided with a horizontally extending hook portion and the other with a cooperating return bend portion, the underside of which is in engagement with the top side of said hook member to prevent displacement thereof, a saddle member secured over the bottom portion of said loop and having inwardly extending ears thereon, a pair of link members pivotally supported between said ears, and flexible means secured to the free ends of said link member.

8. A cable supporting ring comprising a cable receiving loop, parallel arms extending upwardly, in spaced relation, from said loop, one of said arms provided with a horizontally extending hook portion and the other with a cooperating return bend portion, the underside of which is in engagement with the top side of said hook member to prevent displacement thereof, a saddle member secured over the bottom portion of said loop and having inwardly extending ears thereon, said ears being spaced apart and having pivotally mounted therebetween a pair of link members, and flexible means secured to the free ends of said link member.

WILLIAM T. PRITCHARD.